US011281892B2

(12) United States Patent
Chattopadhyay et al.

(10) Patent No.: US 11,281,892 B2
(45) Date of Patent: *Mar. 22, 2022

(54) TECHNOLOGIES FOR EFFICIENT IDENTITY RECOGNITION BASED ON SKIN FEATURES

(71) Applicant: Intel Corporation, Santa Clara, CA (US)

(72) Inventors: Rita Chattopadhyay, Chandler, AZ (US); Tina Alam, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/247,960

(22) Filed: Jan. 15, 2019

(65) Prior Publication Data
US 2019/0340420 A1  Nov. 7, 2019

Related U.S. Application Data

(63) Continuation of application No. 15/196,169, filed on Jun. 29, 2016, now Pat. No. 10,181,073.

(51) Int. Cl.
| | | |
|---|---|---|
| *G06K 9/00* | (2006.01) | |
| *G06K 9/46* | (2006.01) | |
| *G06K 9/62* | (2022.01) | |

(52) U.S. Cl.
CPC ..... *G06K 9/00281* (2013.01); *G06K 9/00067* (2013.01); *G06K 9/00288* (2013.01);
(Continued)

(58) Field of Classification Search
None
See application file for complete search history.

(56) References Cited

U.S. PATENT DOCUMENTS

| 8,208,692 B2 * | 6/2012 | Zhang ............... G06K 9/00006 |
| | | 382/115 |
| 10,181,073 B2 | 1/2019 | Chattopadhyay et al. |

(Continued)

FOREIGN PATENT DOCUMENTS

WO   WO 2009/029638   *   3/2009

OTHER PUBLICATIONS

A Survey of Biometric Recognition Methods. Delac et al. (Year: 2004).*

(Continued)

*Primary Examiner* — Delomia L Gilliard
(74) *Attorney, Agent, or Firm* — Hanley, Flight & Zimmerman, LLC

(57) ABSTRACT

Technologies for efficient identity recognition based on skin features include a compute device. The compute device includes an image capture device and an image acquisition module to obtain, with the image capture device, an image that depicts the skin of the person. The compute device also includes a skin feature determination module to identify pixels in the obtained image that are associated with the skin of the person, and determine one or more features of the skin based on the identified pixels. Additionally, the compute device includes an identity determination module to generate a feature vector that includes the determined features of the skin, and analyze the feature vector with reference data to determine an identity of the person. Other embodiments are described and claimed.

23 Claims, 9 Drawing Sheets

(52) U.S. Cl.
CPC ......... *G06K 9/4642* (2013.01); *G06K 9/4652* (2013.01); *G06K 9/6269* (2013.01)

(56) References Cited

U.S. PATENT DOCUMENTS

| | | | |
|---|---|---|---|
| 2003/0103652 A1* | 6/2003 | Lee .................... | G06K 9/00288 382/118 |
| 2007/0064978 A1* | 3/2007 | Chhibber ............. | G06K 9/2018 382/118 |
| 2007/0196001 A1* | 8/2007 | Yanagawa .......... | G06K 9/00288 382/118 |
| 2012/0070042 A1 | 3/2012 | Ioffe et al. | |
| 2014/0037152 A1* | 2/2014 | Tan .................... | G06K 9/00281 382/117 |
| 2014/0050372 A1 | 2/2014 | Qi et al. | |
| 2016/0148080 A1* | 5/2016 | Yoo ..................... | G06K 9/4628 382/157 |

OTHER PUBLICATIONS

A Survey on Pixel-Based Skin Color Detection Techniques. jVezhnevets et al. (Year: 2003).*

International Searching Authority, "Search Report," issued in connection with PCT patent application No. PCT/US2017/034943, dated Aug. 16, 2017, 3 pages.

International Searching Authority, "Written Opinion," issued in connection with PCT patent application No. PCT/US2017/034943, dated Aug. 16, 2017, 7 pages.

United States Patent and Trademark Office, "Non-Final Office action," issued in connection with U.S. Appl. No. 15/196,169, dated Nov. 30, 2017, 13 pages.

United States Patent and Trademark Office, "Final Office action," issued in connection with U.S. Appl. No. 15/196,169, dated May 17, 2018, 13 pages.

United States Patent and Trademark Office, "Notice of Allowance," issued in connection with U.S. Appl. No. 15/196,169, dated Sep. 18, 2018, 15 pages.

* cited by examiner

TECHNOLOGIES FOR EFFICIENT IDENTITY RECOGNITION BASED ON SKIN FEATURES

CROSS-REFERENCE TO RELATED APPLICATIONS

This application is a continuation of U.S. patent application Ser. No. 15/196,169, filed Jun. 29, 2016.

BACKGROUND

Many biometric identity recognition systems identify a user of a compute device from an image of the user's face. Face recognition systems are widely applied, ranging from establishment security, automatic teller machine (ATM) security, passport and visa verifications, to protecting mobile phones and other personal items from unauthorized users. Many of these applications are implemented on resource constrained embedded hardware platforms. A drawback of typical systems is that changes in lighting from one image of the person to another may result in misidentification of the person. Another drawback of such systems is that they typically are affected by facial expression changes. As such, a typical system may misidentify a person when the locations of portions of the person's face have changed relative to each other as a result of a facial expression (e.g., a smile) other than the expression that the system was trained on. Such systems may also misidentify a person when an object, such as a hat, goggles, or hair, partially covers a portion of the person's face. Further, many facial recognition systems are relatively compute intensive, making them particularly taxing on resource constrained devices, such as edge devices of a network.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
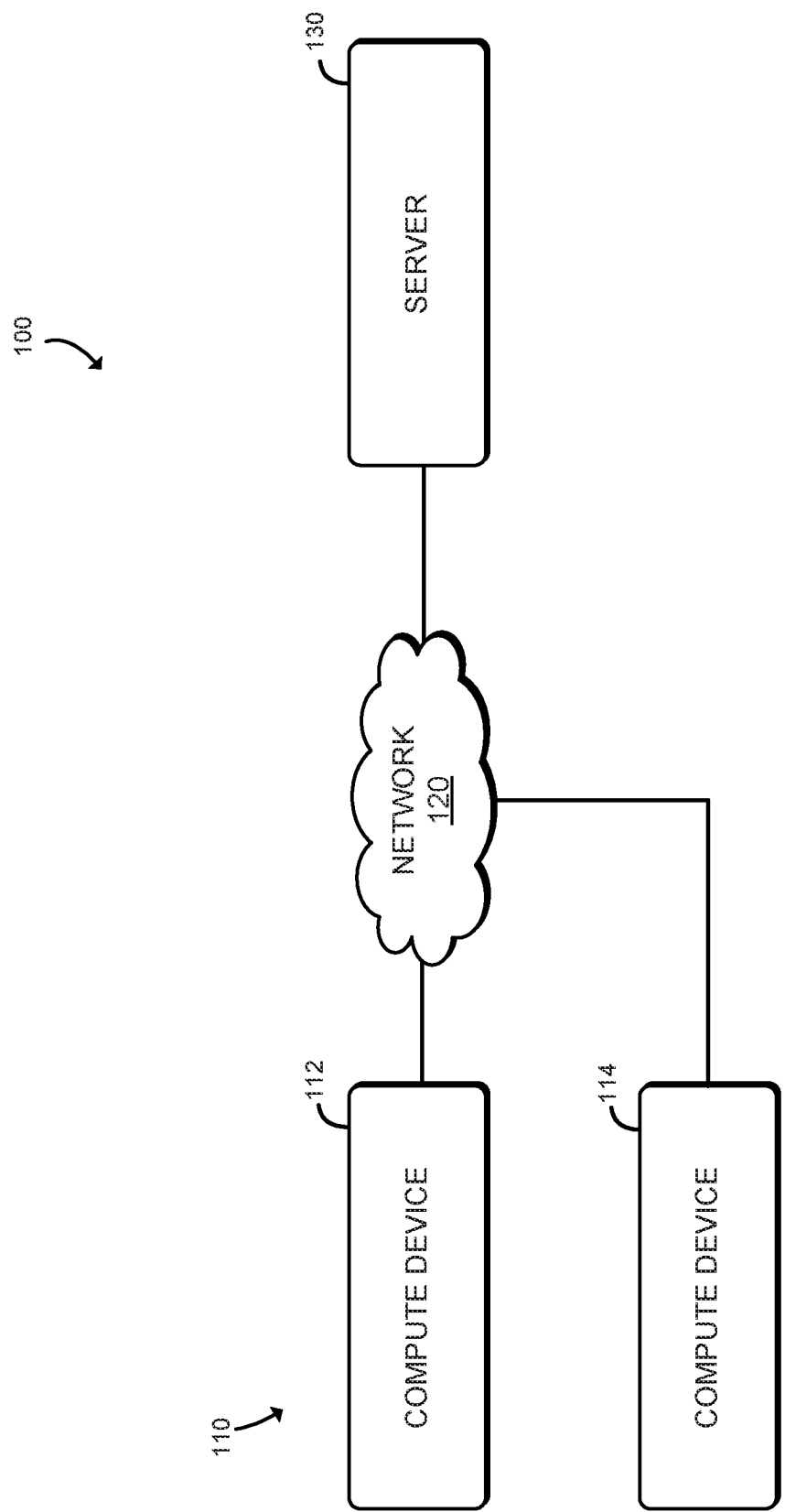
FIG. 1 is a simplified block diagram of at least one embodiment of a system for identifying a person based on features of the person's skin.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for identifying a person based on features of the person's skin includes a set of compute devices 110, including a compute device 112 and another compute device 114 in communication with a server 130 through a network 120. In the illustrative embodiment, the compute devices 110 are edge devices of the network 120 and are resource constrained (i.e., have less processing capability in comparison to the server 130). As such, the compute device 112 may be embodied as a handheld compute device, such as a smartphone, and the compute device 114 may be embodied as an ATM. In operation, in the illustrative embodiment, the compute device 110 obtains an image that depicts the skin of the user (i.e., a person), identifies pixels in the image that are associated with the skin, determines features (i.e., statistical characteristics, such as modes and averages of various color components) of the skin from the identified pixels, generates a feature vector based on the determined features of the skin, and analyzes the feature vector using reference data to determine the identity of the person. The compute device 110 may also determine a distance between the eyes of the person (if the image depicts the person's eyes), and adds, to the feature vector, the determined distance between the eyes of the person to enhance the analysis. By performing the above identity recognition process, the compute device 110 may authenticate the user to access data and/or one or more applications executed on the compute device 110 or on the server 130 in a manner that is less computationally resource intensive and more robust to variations in lighting, facial expressions, and partial occlusion of facial features than typical systems.

Figure 2:
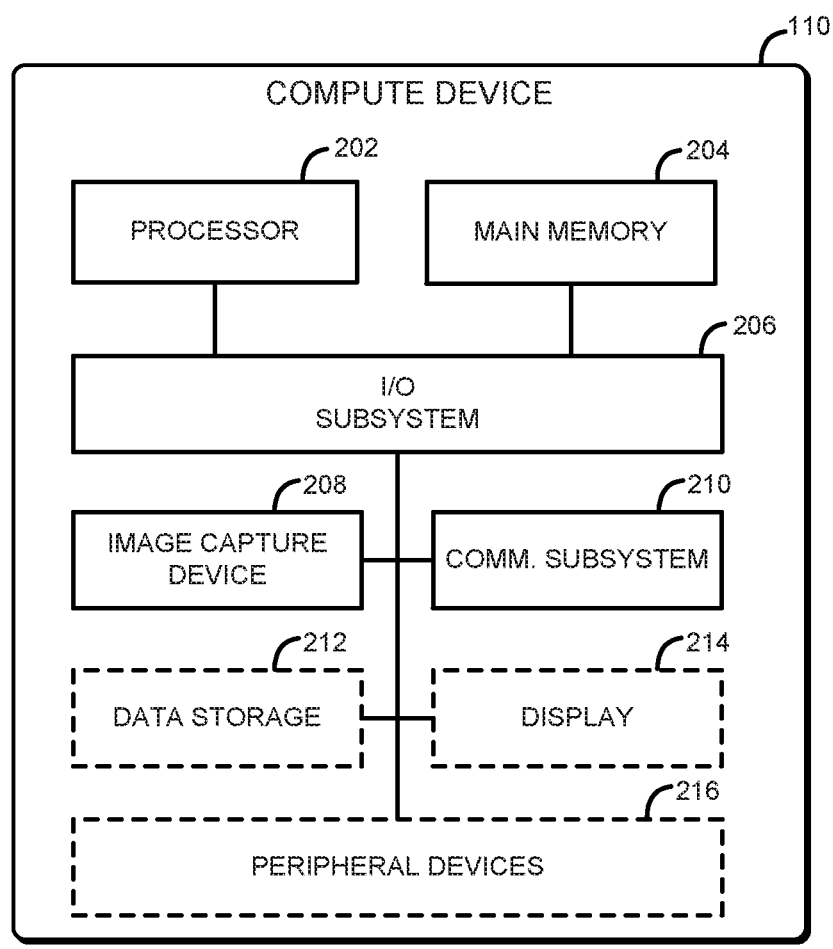
FIG. 2 is a simplified block diagram of at least one embodiment of a compute device of the system of FIG. 1.

Referring now to FIG. 2, each compute device 110 may be embodied as any type of compute device capable of performing the functions described herein. For example, in some embodiments, each compute device 110 may be embodied as, without limitation, a computer, a smartphone, a tablet computer, a consumer electronic device, a smart appliance, an automatic teller machine (ATM), a laptop computer, a notebook computer, and/or any other computing device capable of performing functions to identify a person based on skin features, as described herein. In the illustrative embodiment, the compute device 110 is an edge device, meaning it provides an entry point to the network 120 and has fewer computational resources than backend systems (e.g., the server 130) that provide services for users of the compute devices 110. As shown in FIG. 2, the illustrative compute device 110 includes a processor 202, a main memory 204, an input/output subsystem 206, an image capture device 208, and a communication subsystem 210. Of course, the compute device 110 may include other or additional components, such as those commonly found in a computer (e.g., data storage, display, etc.), in other embodiments. Additionally, in some embodiments, one or more of the illustrative components may be incorporated in, or otherwise from a portion of, another component. For example, the memory 204, or portions thereof, may be incorporated in the processor 202 in some embodiments.

The processor 202 may be embodied as any type of processing device capable of performing the functions described herein. For example, the processor 202 may be embodied as a single or multi-core processor(s) having one or more processor cores, a microcontroller, or other processor or processing/controlling circuit. Similarly, the main memory 204 may be embodied as any type of volatile or non-volatile memory or data storage capable of performing the functions described herein. In operation, the main memory 204 may store various data and software used during operation of the compute device 110 such as feature vector data, image data, model data, authentication data, operating systems, applications, programs, libraries, and drivers. The main memory 204 is communicatively coupled to the processor 202 via the I/O subsystem 206. Of course, in other embodiments (e.g., those in which the processor 202 includes a memory controller), the main memory 204 may be directly communicatively coupled to the processor 202.

The I/O subsystem 206 may be embodied as circuitry and/or components to facilitate input/output operations with the processor 202, the main memory 204, and other components of the compute device 110. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the compute device 110, on a single integrated circuit chip.

The image capture device 208 may be embodied as any type of device capable of capturing an image of a person using the compute device 110, such as a camera that includes a charge coupled device (CCD) or complementary metal-oxide-semiconductor (CMOS) image sensor coupled with a lens to focus received light and a shutter to control the amount of light received by the image sensor. The illustrative image capture device 208 is configured to convert the received light to pixel data defining intensities of component colors for each spatial location in an image.

The illustrative compute device 110 also includes the communication subsystem 210, which may be embodied as one or more devices and/or circuitry capable of enabling communications with one or more compute devices, such as the server 130 or another compute device 110. The communication subsystem 210 may be configured to use any suitable communication protocol to communicate with other devices including, for example, wireless data communication protocols, cellular communication protocols, and/or wired communication protocols.

The compute device 110 may additionally include a data storage device 212, which may be embodied as any type of device or devices configured for short-term or long-term storage of data such as, for example, memory devices and circuits, memory cards, solid-state drives, hard disk drives, or other data storage devices. The data storage device 212 may store data and software used during operation of the compute device 110 such as feature vector data, image data, model data, authentication data, operating systems, applications, programs, libraries, and drivers, as described in more detail herein.

Additionally or alternatively, the compute device 110 may include a display 214. The display 214 may be embodied as, or otherwise use, any suitable display technology including, for example, a liquid crystal display (LCD), a light emitting diode (LED) display, a cathode ray tube (CRT) display, a plasma display, and/or other display usable in a compute device. The display may include a touchscreen sensor that uses any suitable touchscreen input technology to detect the user's tactile selection of information displayed on the display including, but not limited to, resistive touchscreen sensors, capacitive touchscreen sensors, surface acoustic wave (SAW) touchscreen sensors, infrared touchscreen sensors, optical imaging touchscreen sensors, acoustic touchscreen sensors, and/or other type of touchscreen sensors. As described herein, the display 214 may be used to report the result of a user identification process and/or to display data and/or graphical user interfaces of applications executed by the compute device 110 and/or the server 130. Additionally or alternatively, the compute device 110 may include one or more peripheral devices 216. Such peripheral devices 216 may include any type of peripheral device commonly found in a compute device such as speakers, a mouse, a keyboard, and/or other input/output devices, interface devices, and/or other peripheral devices.

Referring back to FIG. 1, the server 130 may be embodied as any type of server computer capable of receiving a result of an identification or authentication process performed by the compute device 110 and providing data or services to an identified or authenticated user of the compute device 110. The server compute device 130 may include components commonly found in a server computer, such as a processor, memory, I/O subsystem, data storage, communication subsystem, etc. Those components may be substantially similar to the corresponding components of the compute device 110. As such, further descriptions of the like components are not repeated herein with the understanding that the description of the corresponding components provided above in regard to the compute device 110 applies equally to the corresponding components of the server 130.

Still referring to FIG. 1, the network 120 may be embodied as any number of various wireless or wired networks. For example, the network 120 may be embodied as, or otherwise include, a publicly-accessible, global network such as the Internet, a cellular network, a wireless or wired wide area network (WAN), or a wireless or wired local area network (LAN). As such, the network 120 may include any number of additional devices, such as additional computers, routers, and switches, to facilitate communications among the devices of the system 100.

Figure 3:
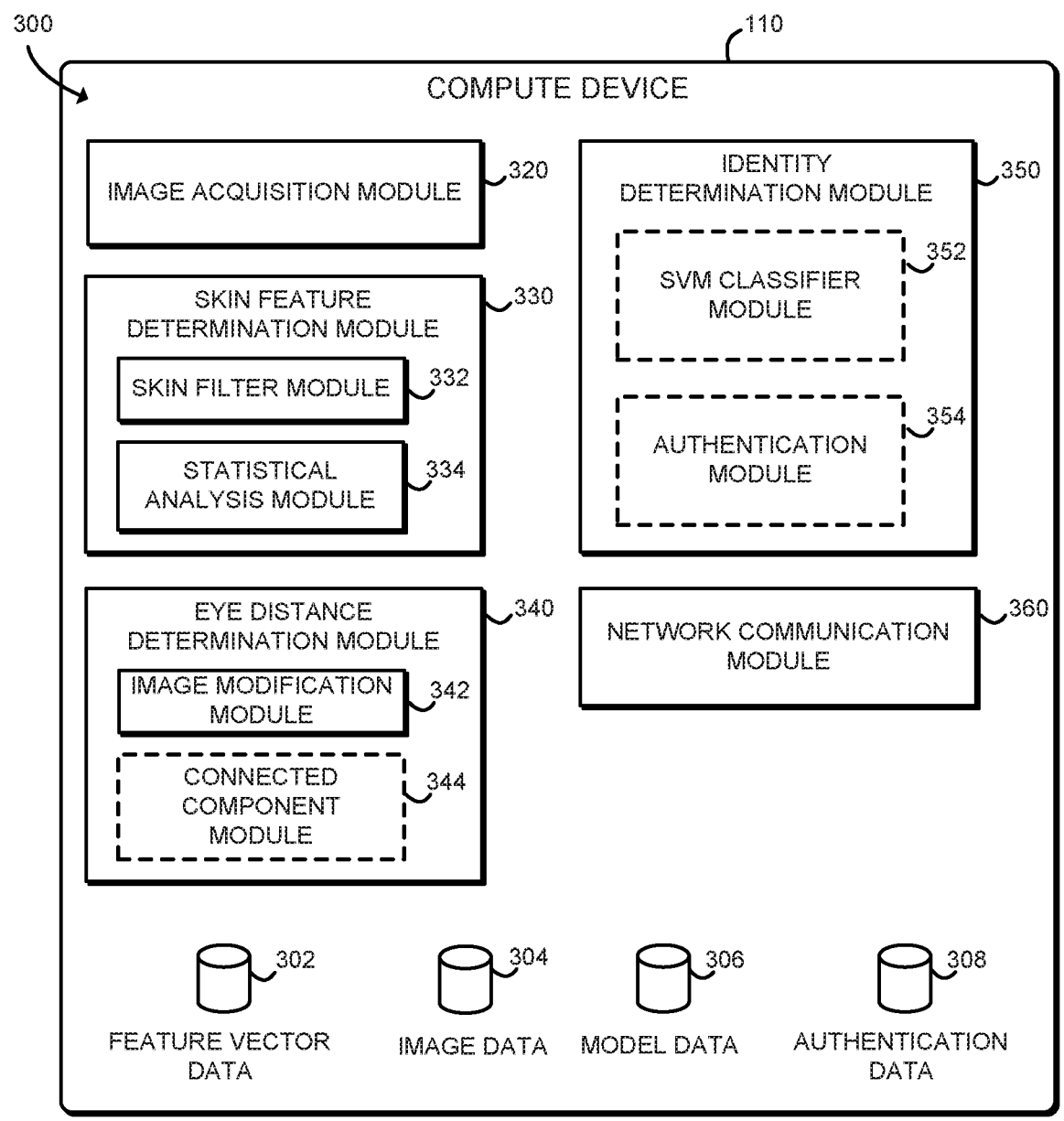
FIG. 3 is a simplified block diagram of at least one embodiment of an environment that may be established by a compute device of FIGS. 1 and 2.

Referring now to FIG. 3, in the illustrative embodiment, the compute device 110 may establish an environment 300 during operation. The illustrative environment 300 includes an image acquisition module 320, a skin feature determination module 330, an eye distance determination module 340, an identity determination module 350, and a network communication module 360. Each of the modules, logic, and other components of the environment 300 may be embodied as hardware, firmware, software, or a combination thereof. As such, in some embodiments, one or more of the modules of the environment 300 may be embodied as circuitry or collection of electrical devices (e.g., image acquisition circuitry 320, skin feature determination circuitry 330, eye distance determination circuitry 340, identity determination circuitry 350, network communication circuitry 360, etc.). It should be appreciated that, in such embodiments, one or more of the image acquisition circuitry 320, skin feature determination circuitry 330, eye distance determination circuitry 340, identity determination circuitry 350, network communication circuitry 360 may form a portion of one or more of the processor 202, main memory 204, image capture device 208, communication subsystem 210 and/or other components of the compute device 110. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 202 or other components of the compute device 110.

In the illustrative environment 300, the compute device 110 also includes feature vector data 302, image data 304, model data 306, and authentication data 308. In the illustrative embodiment, the feature vector data 302 indicates features of the skin of a person, determined by the compute device 110 from the image data 304. The feature vector data 302 may also indicate the distance between the eyes of a user, as determined by the compute device 110. The illustrative image data 304 includes one or more images of a user obtained by the image capture device 208. The model data 306, in the illustrative embodiment, includes reference data to be compared with the feature vector data 302 to determine the identity of a user, as described in more detail herein. In the illustrative embodiment, the authentication data 308 includes data indicative of one or more user identities, data and/or service access rights associated with the one or more user identities, and results of user identification and authentication processes performed by the compute device 110. The feature vector data 302, image data 304, model data 306, and authentication data 308 may be accessed by the various modules and/or sub-modules of the compute device 110. It should be appreciated that the compute device 110 may include other components, sub-components, modules, sub-modules, and/or devices commonly found in a compute device, which are not illustrated in FIG. 3 for clarity of the description.

The image acquisition module 320, which may be embodied as hardware, firmware, software, virtualized hardware, emulated architecture, and/or a combination thereof as discussed above, is configured to obtain an image that depicts the skin of the person. The image may be an image of the face of the person, or of another body part, such as the palm of the hand of the person. In the illustrative embodiment, the image acquisition module 320 is configured to store the acquired image in the image data 304. The image acquisition module 320 may be configured to continually obtain a stream of images using the image capture device or acquire one or more images in response to a request from the user provided through a graphical user interface, a spoken word, or through another input method. Additionally or alternatively, the image acquisition module may obtain the image in response to a request from another device, such as from the server 130. In some embodiments, obtaining an image that depicts the skin of the person may be performed by one or more specialized hardware components such as the image capture device 208.

The skin feature determination module 330, which may be embodied as hardware, firmware, software, virtualized hardware, emulated architecture, and/or a combination thereof as discussed above, is configured to identify pixels in the obtained image that are associated with the skin of the person and determine one or more features of the skin based on the identified pixels. To do so, in the illustrative embodiment, the skin feature determination module 330 includes a skin filter module 332 and a statistical analysis module 334. The skin filter module 332, in the illustrative embodiment, is configured to apply one or more filters to the obtained image to exclude pixels whose component values (e.g., red, green, and blue values) do not meet predefined mathematical criteria, such that the remaining pixels are likely representative of the skin of the person. The skin filter module 332 may be configured to exclude those pixels by setting their component color values to zero or another predefined value that will cause those pixels to be excluded from a subsequent analysis for determining features of the person's skin. In the illustrative embodiment, the statistical analysis module 334 is configured to perform a statistical analysis of the remaining pixels that have not been excluded by the skin filter module 332. For example, the statistical analysis module 334 may be configured to bin the pixel values and count the number of pixels falling into each bin. In the illustrative embodiment, the statistical analysis module 334 is configured to determine the statistical modes (i.e., most common values) of red, green, blue, and gray values in the pixels associated with the skin of the user. The statistical analysis module 334 may also determine normalized values of these modes. Additionally or alternatively, the statistical analysis module 334 may determine averages of the red, green, and blue values in the identified pixels (i.e., the pixels associated with the skin). In some embodiments, identifying pixels in the obtained image that are associated with the skin of the person and determining one or more features of the skin based on the identified pixels may be performed by one or more specialized hardware components such as a graphics accelerator.

It should be appreciated that each of the skin filter module 332 and the statistical analysis module 334 may be separately embodied as hardware, firmware, software, virtualized hardware, emulated architecture, and/or a combination thereof. For example, the skin filter module 332 may be embodied as a hardware component, while the statistical analysis module 334 is embodied as a virtualized hardware component or as some other combination of hardware, firmware, software, virtualized hardware, emulated architecture, and/or a combination thereof.

The eye distance determination module 340, which may be embodied as hardware, firmware, software, virtualized hardware, emulated architecture, and/or a combination thereof as discussed above, is configured to determine a distance between the eyes of the person based on the obtained image. To do so, in the illustrative embodiment, the eye distance determination module 340 includes an image modification module 342 and a connected component module 344. The image modification module 342, in the illustrative embodiment, is configured to apply one or more modifications to the image to prepare the image for determination of the distance between the user's eyes. For example, the image modification module 342 may convert the image from color to grayscale and perform an auto-threshold process to generate a binary black and white version of the image based on the auto-threshold process. In the illustrative embodiment, the image modification module 342 may perform an edge detection process to identify edges in the image, crop the image to an area that depicts the eyes of the user, and/or perform a dilation process on the area in the image depicting the eyes. The connected component module 344, in the illustrative embodiment, is configured to execute a connected components algorithm to identify blocks within the image that contain the eyes and determine, as the eye-to-eye distance, the Euclidean distance between the centers of the blocks. In some embodiments, determining the distance between the eyes of the person based on the obtained image may be performed by one or more specialized hardware components.

It should be appreciated that each of the image modification module 342 and the connected component module 344 may be separately embodied as hardware, firmware, software, virtualized hardware, emulated architecture, and/or a combination thereof. For example, the image modification module 342 may be embodied as a hardware component, while the connected component module 344 is embodied as a virtualized hardware component or as some other combination of hardware, firmware, software, virtualized hardware, emulated architecture, and/or a combination thereof.

The identity determination module 350, which may be embodied as hardware, firmware, software, virtualized hardware, emulated architecture, and/or a combination thereof as discussed above, is configured to generate a feature vector that includes the determined features of the skin and analyze the feature vector with reference data to determine an identity of the person. To do so, in the illustrative embodiment, the identity determination module 350 includes a support vector machine (SVM) classifier module 352 and an authentication module 354. In the illustrative embodiment, the SVM classifier module 352 is configured to apply the feature vector to an SVM classifier, which has been trained with reference data (i.e., training data) that is based on multiple images of the user and potentially other people in various lighting conditions (e.g., daylight, bulb, tube, etc.). In the illustrative embodiment, the SVM classifier module is configured with a linear kernel, a C parameter (i.e., a value that affects the trade-off between complexity and proportion of non-separable samples) of 100, and an Epsilon (i.e., the value of regularization of the parameter C) value of 0.00001. The SVM classifier module 352, in the illustrative embodiment, is configured to produce a determination of the identity of the user from the image, along with a confidence value indicative of a confidence that the determined identity is accurate. The authentication module 354, in the illustrative embodiment, is configured to determine whether the determined identity satisfies predefined authentication data (e.g., authentication data 308). Further, in the illustrative embodiment, the authentication module 354 is configured to enable, in response to a determination that the determined identity satisfies the predefined authentication data, access to certain resources (e.g., data and/or services) available to the compute device 110 (e.g., stored and/or executed locally, or available through the network 120 from the server 130 or another device). Additionally, in the illustrative embodiment, the authentication module 354 is configured to withhold, in response to a determination that the determined identity does not satisfy the predefined authentication data, access to the resources available to the compute device 110. In some embodiments, generating a feature vector that includes the determined features of the skin and analyzing the feature vector with reference data to determine an identity of the person may be performed by one or more specialized hardware components.

It should be appreciated that each of the SVM classifier module 352 and the authentication module 354 may be separately embodied as hardware, firmware, software, virtualized hardware, emulated architecture, and/or a combination thereof. For example, the SVM classifier module 352 may be embodied as a hardware component, while the authentication module 354 is embodied as a virtualized hardware component or as some other combination of hardware, firmware, software, virtualized hardware, emulated architecture, and/or a combination thereof.

The network communication module 360, which may be embodied as hardware, firmware, software, virtualized hardware, emulated architecture, and/or a combination thereof as discussed above, is configured to manage inbound and outbound data communications to and from the compute device 110, respectively. For example, the network communication module 360 may be configured to transmit the result (i.e., a determined identity, an identification failure, an authentication failure) of an identification or authentication process performed by the compute device 110. The network communication module 360 may further be configured to transmit requests for services and/or data to the server 130 and receive results of the requests from the server 130. In some embodiments, managing inbound and outbound data communications to and from the compute device 110 may be performed by one or more specialized hardware components, such as a network interface controller (NIC).

Figure 4:
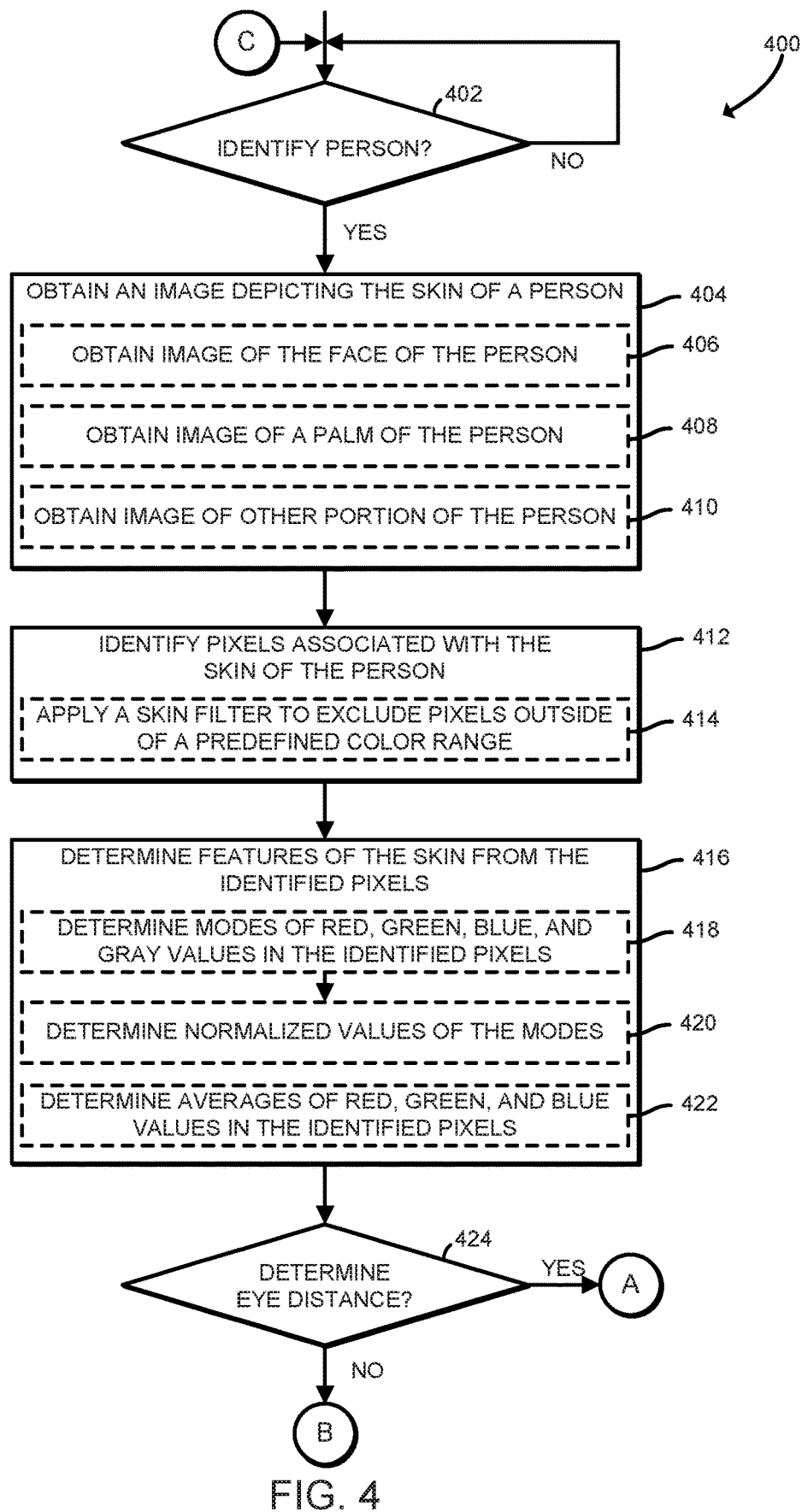
FIGS. 4-6 are a simplified flow diagram of at least one embodiment of a method for identifying a person that may be performed by the compute device of FIGS. 1 and 2.

Referring now to FIG. 4, in use, the compute device 110 may execute a method 400 for identifying a person based at least in part on skin features. The method 400 begins with block 402, in which the compute device 110 determines whether to identify a person. In the illustrative embodiment, the compute device 110 determines to identify a person, such as a user of the compute device 110, in response to a request from the user, input through a graphical user interface, a physical user interface component, such as a button, or a spoken word. Additionally or alternatively, the compute device 110 may determine to identify a person in response to receiving a request from a remote compute device, such as the server 130. In other embodiments, the compute device 110 may be configured to continually attempt to identify a person, rather than awaiting a specific request to do so.

Regardless, in response to a determination to identify a person, the method 400 advances to block 404 in which the compute device 110 obtains an image depicting the skin of the person. In the illustrative embodiment, the compute device 110 obtains the image using the image capture device 208. As indicated in block 406, in doing so, the compute device 110 obtains an image of the face of the person. Alternatively, the compute device 110 may obtain an image of a palm of the person 408, as indicated in block 408. Additionally or alternatively, the compute device 110 may obtain an image depicting the skin from another portion of the person, as indicated in block 410. As explained in more detail herein, the method 400 is not dependent on receiving a depiction of the person's face in order to recognize the person, but the compute device 110 may perform additional steps to enhance the accuracy of the identification process if such data is obtained.

In block 412, the compute device 110 identifies pixels associated with the skin of the person. In doing so, in the illustrative embodiment, the compute device 110 applies a skin filter to exclude pixels outside of a predefined color range. In the illustrative embodiment, the predefined color range is provided by the following equations, in which R represents the value of the red component of a pixel, G represents the value of a green component of the pixel, and B represents the value of the blue component of the pixel:

$$0.0 \leq \frac{R-G}{R+G} \leq 0.5 \quad \text{(Equation 1)}$$

$$\frac{B}{(R+G)} \leq 0.5 \quad \text{(Equation 2)}$$

In the illustrative embodiment, the compute device 110 determines whether each pixel of the image satisfies the conditions defined in Equations 1 and 2. For a given pixel, if the conditions are not satisfied, the compute device 110 sets the value of the pixel to zero or another value indicating that the pixel does not represent skin. In other embodiments, the predefined color range may be defined as a different mathematical relationship among the pixel values, or may be a set of absolute pixel values rather than a mathematical relationship.

In block 416, the compute device 110 determines features of the skin from the identified pixels (i.e., the pixels identified as depicting the skin of the person). In doing so, the compute device 110 may bin or group the color values of the pixels, by creating value ranges for each color component (e.g., 0-10, 11-20, 21-30, etc.), and performing a statistical analysis of the binned pixels. In other embodiments, the compute device 110 may perform a statistical analysis of the pixel values without initially assigning the pixel values to such bins. As indicated in block 418, the compute device 110 may determine modes (i.e., the most common color value) for each of the red, green, blue, and gray values of the pixels identified as depicting skin. The compute device 110 may additionally determine normalized values (e.g., values falling within the range of 0 to 1) of the modes, as indicated in block 420. As indicated in block 422, the compute device 110 may determine averages of the red, green, and blue values in the identified pixels. It should be understood that while the analysis described above is performed on red, green, blue, and gray values of the pixels, in other embodiments, the compute device 110 may operate on the pixels using a different color model, such as the cyan, magenta, yellow, and key (black) (CMYK) color model, or other models.

In block 424, the compute device 110 determines whether to determine an eye distance (i.e., distance between the eyes of the person). In doing so, the compute device 110 may determine whether the compute device 110 has been configured (e.g., in configuration settings) or otherwise requested to do so. In response to a determination to determine the eye distance, the method 400 advances to block 426 of FIG. 5 to determine the distance between the eyes of the person. Otherwise, the method 400 advances to block 446 to generate a feature vector, as described in more detail herein.

Figure 5:
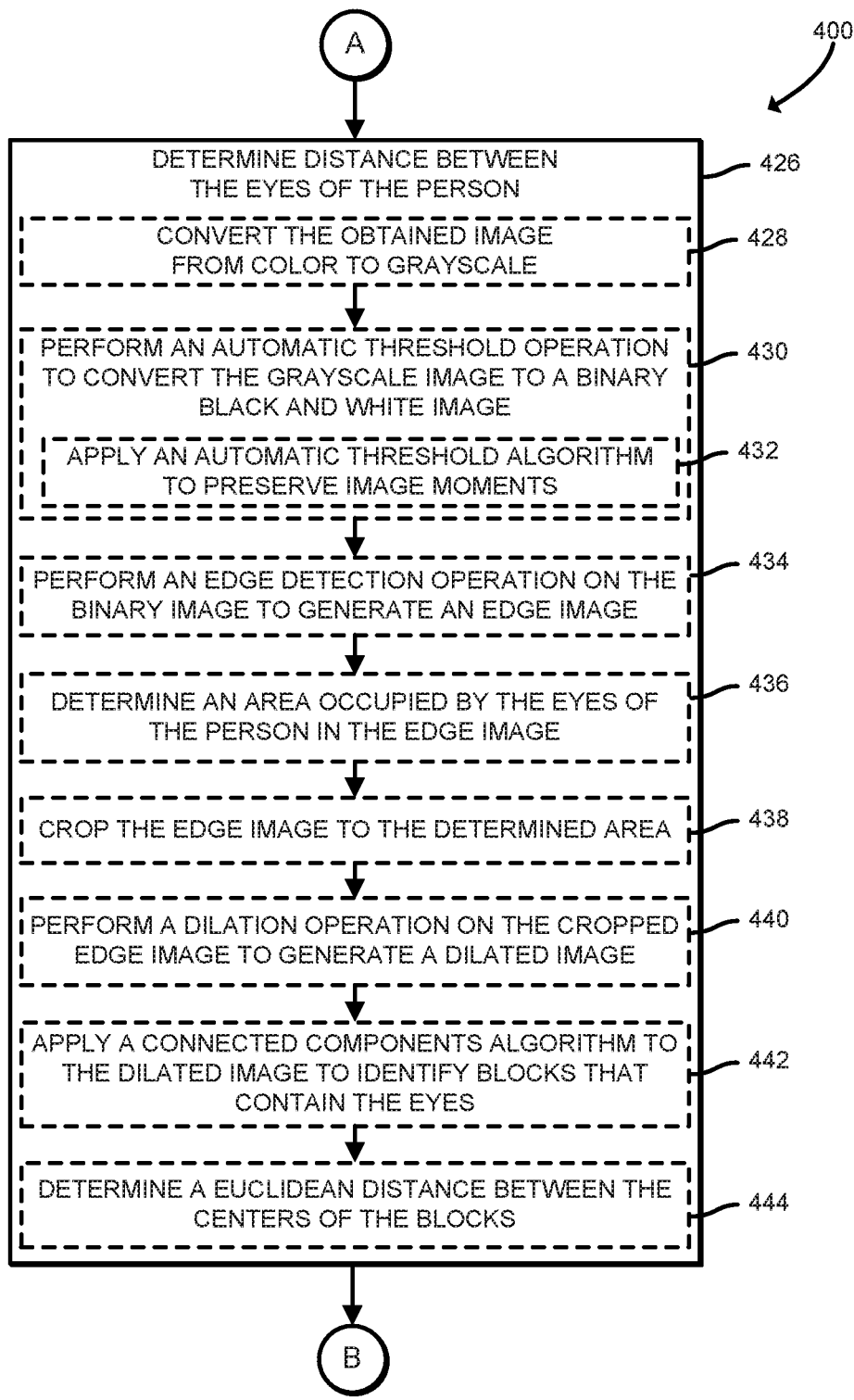

Referring now to FIG. 5, in block 426, the compute device 110 determines the distance between the eyes of the person. In doing so, as indicated in block 428, the compute device 110 may convert the obtained image from color to grayscale. Further, the compute device 110 may perform an automatic threshold operation to convert the grayscale image to a binary black and white image, as indicated in block 430. In other words, the compute device 110 may set pixel values that satisfy a predefined pixel value threshold to one and may set the pixel values that do not satisfy the threshold to zero. As indicated in block 432, in performing the automatic threshold operation, the compute device 110 may apply an automatic threshold algorithm to preserve image moments (i.e., weighted averages of the image pixels' intensities or other function chosen to have an attractive property). In block 434, the illustrative compute device 110 performs an edge detection operation on the binary image to generate an edge image. In the illustrative embodiment, in block 436, the compute device 110 additionally determines an area occupied by the eyes of the person in the edge image generated in block 434. Further, the illustrative compute device 110 crops the edge images to the determined area (i.e., the area determined to be occupied by the eyes of the person), as indicated in block 438. In block 440, the illustrative compute device 110 performs a dilation operation on the cropped edge image from block 438, to generate a dilated image. In the illustrative embodiment, the compute device 110 additionally applies a connected components algorithm to the dilated image to identify blocks that contain the eyes of the person, as indicated in block 442. Subsequently, as indicated in block 444, the illustrative compute device 110 determines a Euclidean distance between the centers of the blocks that were identified in block 442. After determining the distance between the eyes of the person, the method 400 advances to block 446 of FIG. 6, in which the compute device 110 generates a feature vector.

Figure 6:
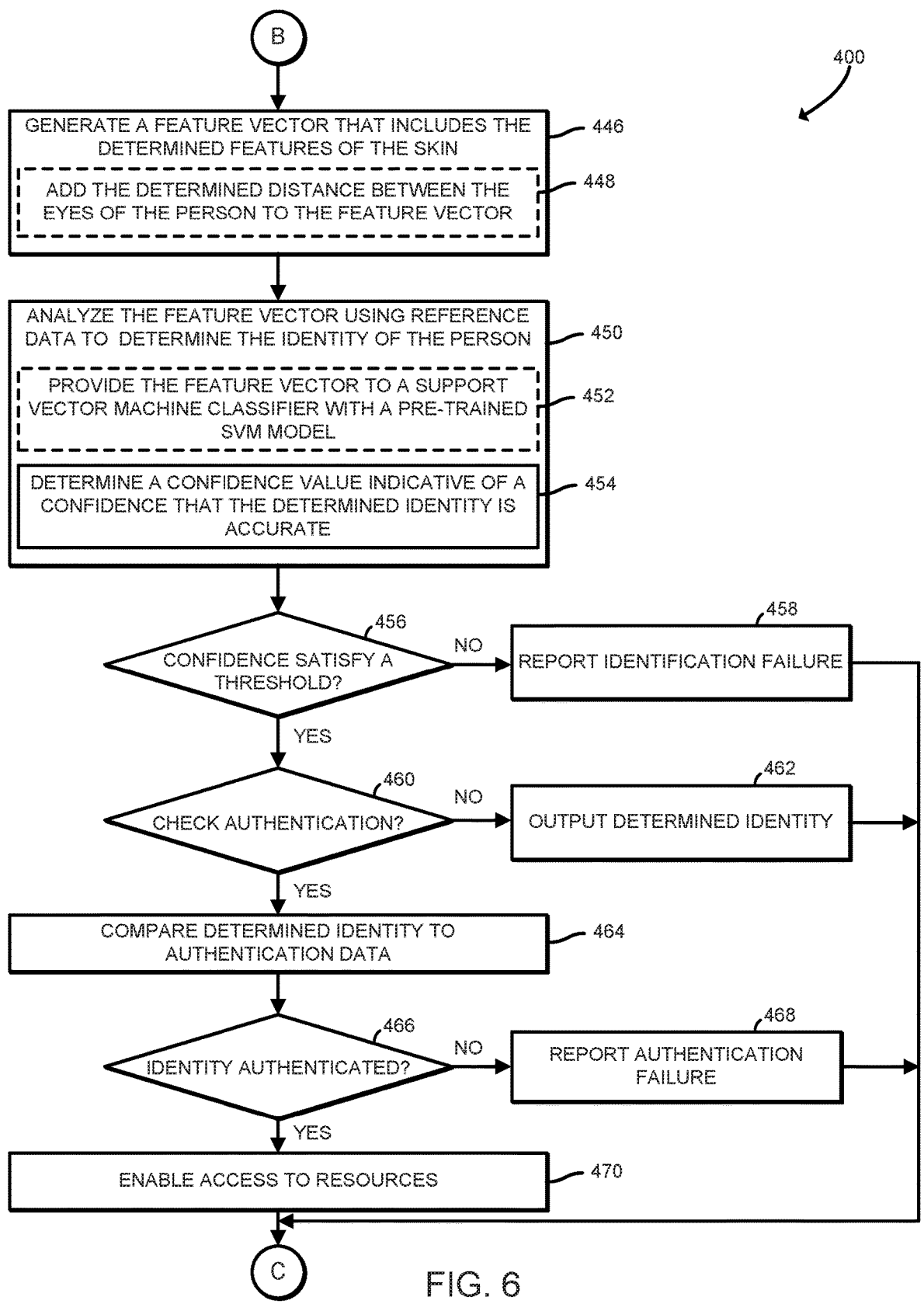

Referring now to FIG. 6, in block 446, the compute device 110 generates a feature vector that includes the determined features of the skin of the user from block 416 of FIG. 4. The determined features may include modes of the red, green, blue, and gray values of the pixels that depict the skin of the user, averages of the red, green and blue values of the pixels, and/or other properties of the pixels that were determined to be associated with the skin of the person. As indicated in block 448, the compute device 110 may add the determined distance between the eyes of the person to the feature vector, if the compute device 110 determined the distance between the eyes of the person in block 426 of FIG. 5, described above. In block 450, the compute device 110 analyzes the feature vector using reference data (i.e., a reference set of images, feature vector data, or classifier training data, such as model data 306) to determine the identity of person. In doing so, the compute device 110 may provide the feature vector to a support vector machine (SVM) classifier having a pre-trained SVM model, as indicated in block 452. Additionally, in analyzing the feature vector, the illustrative compute device 110 determines a confidence value (e.g., a numeric value, such as a percentage, or a qualitative value) indicative of a confidence that the determined identity is accurate, as indicated in block 454.

In block 456, the compute device 110 determines whether the confidence value from block 454 satisfies a predefined threshold, such as a predefined percentage or other numeric value or qualitative value. If the compute device 110 determines that the confidence value does not satisfy the threshold, the method 400 advances to block 458 in which the compute device 110 reports an identification failure. The compute device 110 may report the identification failure to an internal log, to another process executed within the compute device 110 (e.g., an application) that relies on an identification of the person, to the server 130, and/or through an output device such as the display 214. Referring back to block 456, if the compute device 110 determines that the confidence value does satisfy the threshold, the method advances to block 460 in which the compute device 110 determines, based on a configuration setting, the request to identify the person, and/or other factors, whether to check if the identified person is to be authenticated for access to a particular resource (e.g., service, data, etc.). If the compute device 110 determines that authentication is not to be performed, the method 400 advances to block 462 in which the compute device 110 outputs the determined identity. In doing so, the compute device 110 may output the determined identity to a process executed by the compute device 110 or the server 130, to an internal log, and/or through an output device such as the display 214. Otherwise, the method 400 advances to block 464 in which the compute device 110 compares the determined identity of the person to the authentication data 308. In doing so, the compute device 110 may determine, from the authentication data 308, whether the identified person is indicated as having access rights to the requested resource. In response to a determination that the identity is not authenticated, the method 400 advances to block 466 in which the compute device 110 reports an authentication failure, such as to another process executed by the compute device 110 or the server 130, an internal log, and/or to an output device such as the display 214. Otherwise, the method 400 advances to block 470 in which the compute device 110 enables access to the resource.

Figure 7:
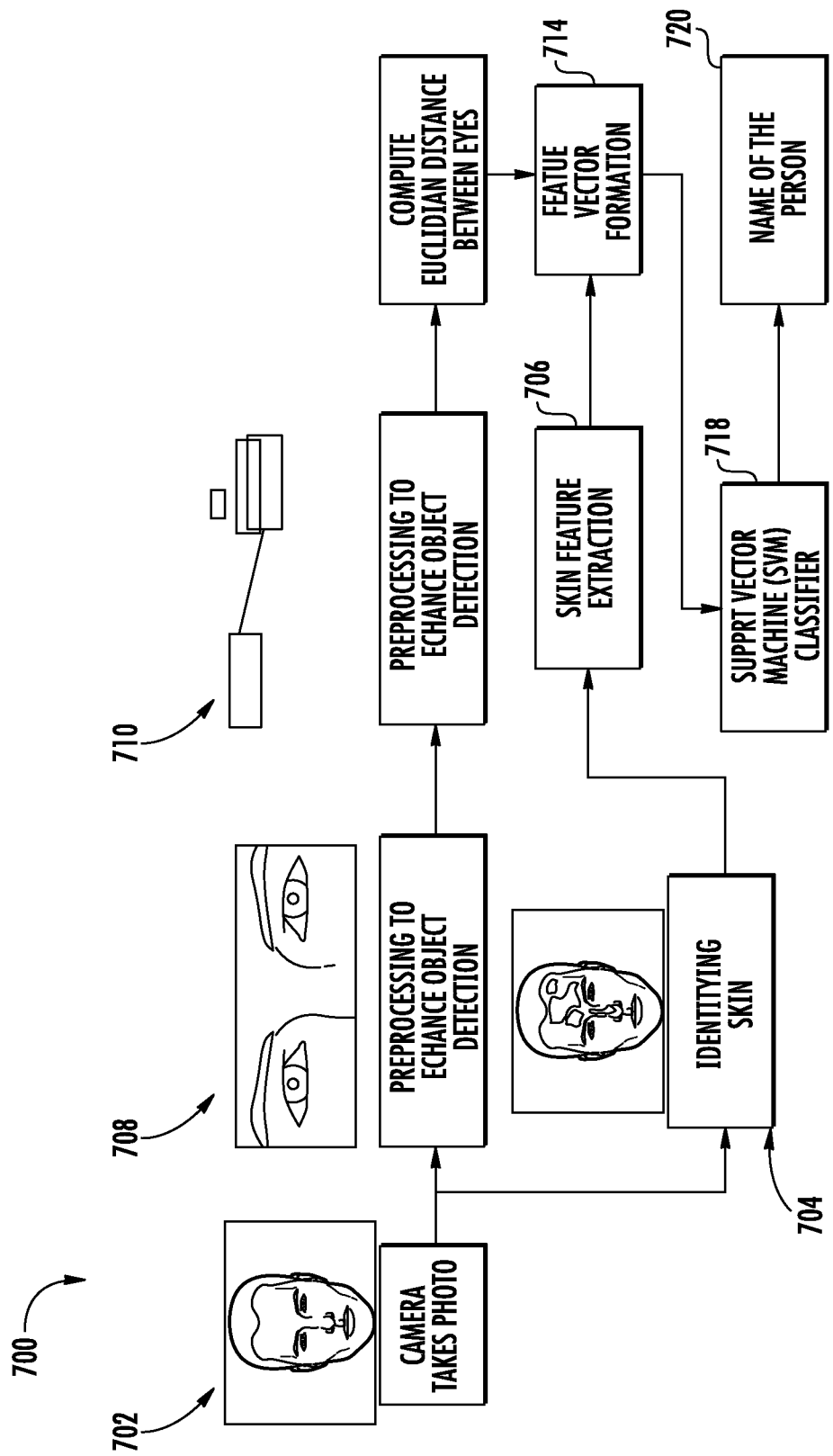
FIG. 7 is a simplified flow diagram of stages of the method of FIGS. 4-6.

Referring now to FIG. 7, a simplified flow diagram 700 illustrates operations performed by the illustrative compute device 110 in identifying the person in the method 400 described above. As indicated in block 702, the compute device 110 initially obtains an image of the person, such as by taking a photograph, using the image capture device 208, which may be a camera. As indicated, the image may contain a depiction of the person's face, while in other embodiments, the picture may depict a different portion of the person, such as the person's palm. In block 704, the compute device 110 identifies the skin of the person. In block 706, the compute device 110 performs a skin feature extraction, such as by performing the analysis described with reference to block 416 in FIG. 4. In block 714, the compute device 110 forms a feature vector that includes the features extracted from the pixels depicting the person's skin. If the image obtained in block 702 includes the person's eyes, the compute device 110 may perform additional steps to obtain additional features for the feature vector. In doing so, in the illustrative embodiment, the compute device 110 preprocesses the image to enhance object detection, as described with reference to block 426 of FIG. 5. In block 410, the compute device 110 may locate the eyes, using the preprocessed image as an input. As shown, the compute device 110 may perform a connected components algorithm to generate blocks that include the eyes of the person and, as indicated in block 412, the compute device 110 may compute the Euclidean distance between the eyes, such as by computing the distance between the centers of the blocks. The compute device 110 may add the computed distance to the feature vector in block 714. In block 716, the illustrative compute device 110 provides the feature vector to an SVM classifier to identify the person and in block 718, the compute device 110 determines the identity (e.g., the name) of the person, as identified by the SVM classifier.

Figure 8:
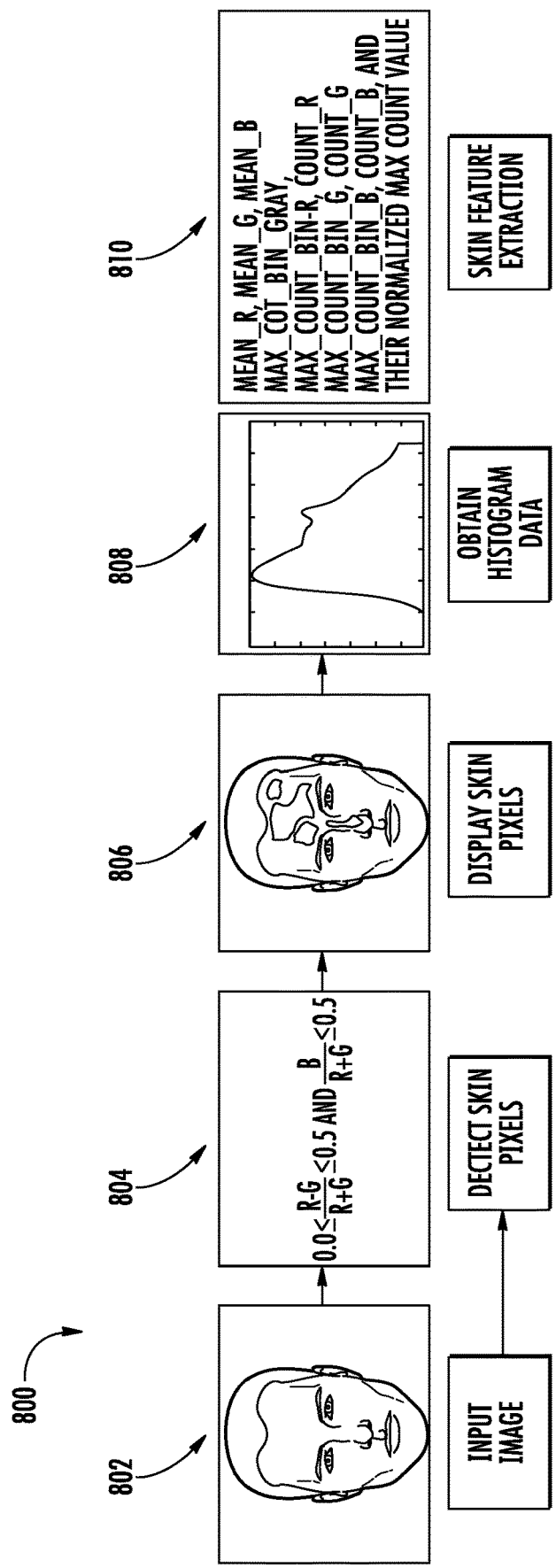
FIG. 8 is a simplified flow diagram of stages of at least one embodiment of a method for determining skin features of a person that may be performed by the compute device of FIGS. 1 and 2.

Referring now to FIG. 8, a simplified flow diagram 800 illustrates operations performed by the compute device 110 in determining skin features of a person. In block 802, the compute device 110 may receive an input image of the person. In block 804, the compute device 110 may detect the pixels that depict the skin of the person, such as by filtering out the pixels having color components that do not satisfy a set of criteria. In the illustrative embodiment, the criteria are provided by Equations 1 and 2, described above. In block 806, the compute device 110 may display the skin pixels of the person, to show the result of the filtering. In block 808, the illustrative compute device 110 obtains histogram data, such as by binning or otherwise categorizing and counting the occurrences of pixel values that fall within predefined ranges. In block 810, the illustrative compute device 110 extracts features of the skin, such as by determining the modes of the color values and gray values, determining normalized versions of these values, and/or determining averages of the color values of the pixels.

Figure 9:
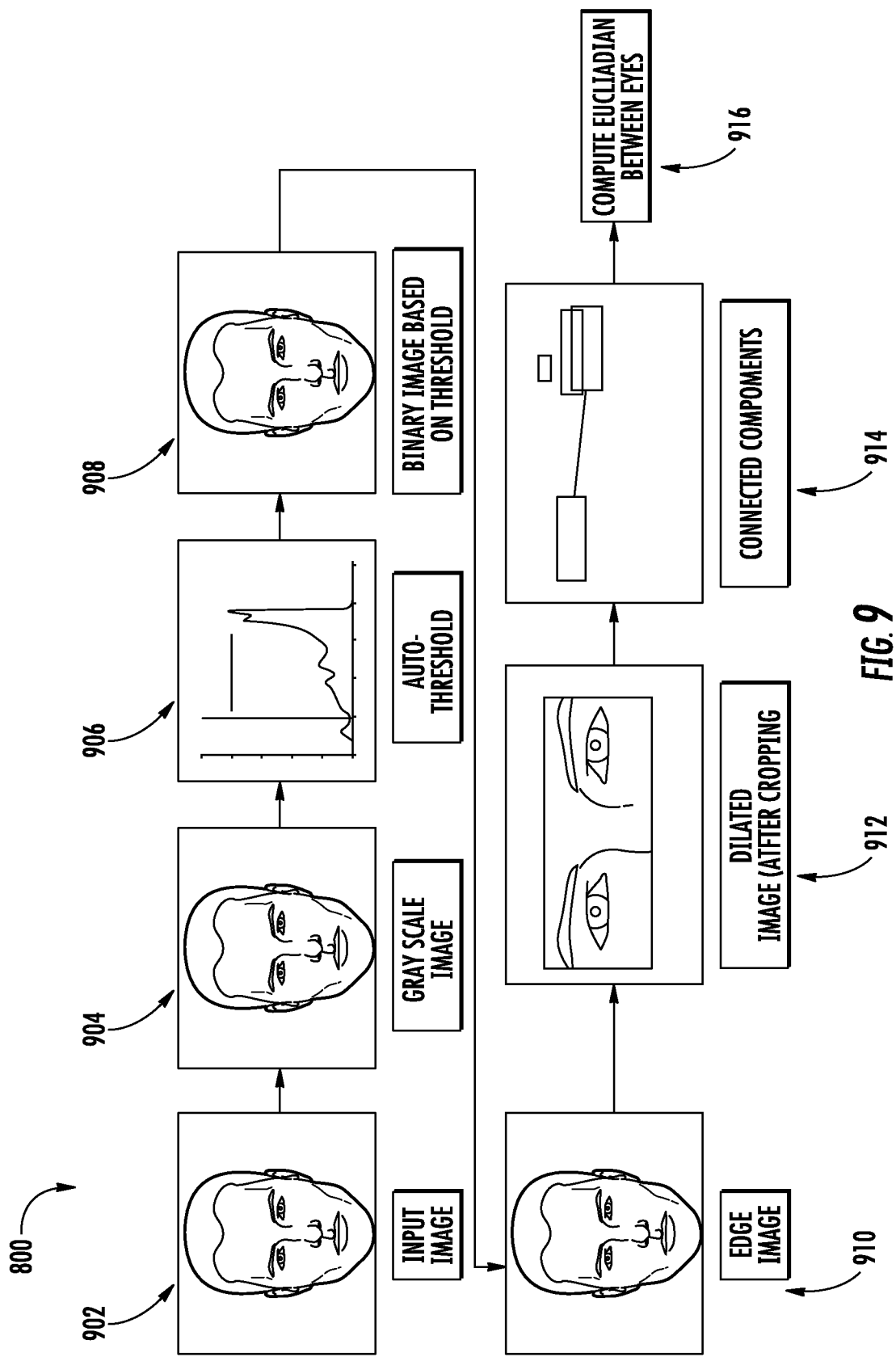
FIG. 9 is a simplified diagram of stages of at least one embodiment of a method for determining a distance between the eyes of a person that may be performed by the compute device of FIGS. 1 and 2.

Referring now to FIG. 9, a simplified flow diagram 900 illustrates operations performed by the compute device 110 in determining the distance between the eyes of a person. The flow diagram 900 corresponds with blocks 426 through 444 of FIG. 4. In block 902, the illustrative compute device 110 receives an input image that depicts the eyes of the person. In block 904, the compute device 110 generates a grayscale image from the input image. In block 906, the compute device 110 performs an automatic threshold operation to set pixel values that satisfy a threshold value to one and to set the other pixel values to zero. A resulting binary image is shown in block 908. In block 910, the illustrative compute device 110 performs an edge detection process to generate an edge image. Further, in block 912, the illustrative compute device 110 crops the image to an area that contains the eyes and performs a dilation process on the cropped image. The illustrative compute device 110 subsequently performs a connected components algorithm on the dilated image to identify blocks that contain the eyes, as indicated in block 914. In block 916, the illustrative compute device 110 computes the Euclidean distance between the eyes, such as by determining the distance between the centers of the blocks that contain the eyes.

EXAMPLES

Illustrative examples of the technologies disclosed herein are provided below. An embodiment of the technologies may include any one or more, and any combination of, the examples described below.

Example 1 includes a compute device to identify a person based on skin features, the compute device comprising an image capture device; an image acquisition module to obtain, with the image capture device, an image that depicts the skin of the person; a skin feature determination module to (i) identify pixels in the obtained image that are associated with the skin of the person, and (ii) determine one or more features of the skin based on the identified pixels; and an identity determination module to (i) generate a feature vector that includes the determined features of the skin, and (ii) analyze the feature vector with reference data to determine an identity of the person.

Example 2 includes the subject matter of Example 1, and wherein to determine one or more features of the skin based on the identified pixels comprise to determine the one or more features of the skin based on a color of each identified pixel.

Example 3 includes the subject matter of any of Examples 1 and 2, and wherein to determine the one or more features comprises to determine a mode for each of red, green, blue, and gray values of the identified pixels; and determine an average of each of the red, green, and blue values.

Example 4 includes the subject matter of any of Examples 1-3, and wherein to determine the one or more features further comprises to determine normalized values of the averages of the red, green, and blue values.

Example 5 includes the subject matter of any of Examples 1-4, and wherein to identify pixels associated with the skin comprises to exclude pixels with color values that fall outside of a predefined range of color values.

Example 6 includes the subject matter of any of Examples 1-5, and wherein to analyze the feature vector comprises to provide the feature vector to a support vector machine (SVM) classifier with a pre-trained SVM model that is based on other images that depict skin.

Example 7 includes the subject matter of any of Examples 1-6, and wherein to obtain the image comprises to obtain an image of the face of the person.

Example 8 includes the subject matter of any of Examples 1-7, and wherein to obtain the image comprises to obtain an image of a palm of the person.

Example 9 includes the subject matter of any of Examples 1-8, and wherein the identity determination module is further to output an indication of the determined identity and a confidence value indicative of a confidence that the determined identity is accurate.

Example 10 includes the subject matter of any of Examples 1-9, and further including an eye distance determination module to determine a distance between the eyes of the person based on the obtained image, wherein the identity determination module is further to add the determined distance to the feature vector to determine the identity of the person based additionally on the determined distance.

Example 11 includes the subject matter of any of Examples 1-10, and wherein to determine the distance between the eyes comprises to convert the obtained image from color to grayscale; perform an automatic threshold operation on the grayscale image to convert the grayscale image to a binary black and white image; perform an edge detection operation on the binary image to generate an edge image; determine an area occupied by the eyes in the edge image; crop the edge image to the determined area to generate a cropped edge image; perform a dilation operation on the cropped edge image to generate a dilated image; apply a connected components algorithm to the dilated image to identify blocks that contain the eyes; and determine a Euclidean distance between the centers of the identified blocks.

Example 12 includes the subject matter of any of Examples 1-11, and wherein to perform an edge detection operation comprises to apply an edge detection algorithm to preserve image moments.

Example 13 includes the subject matter of any of Examples 1-12, and wherein the identification module is further to determine whether the determined identity satisfies predefined authentication data; enable, in response to a determination that the determined identity satisfies the predefined authentication data, access to one or more resources available to the compute device; and withhold, in response to a determination that the determined identity does not satisfy the predefined authentication data, access to the one or more resources available to the compute device.

Example 14 includes the subject matter of any of Examples 1-13, and wherein the one or more resources include a server coupled to the compute device.

Example 15 includes the subject matter of any of Examples 1-14, and wherein to identify pixels associated with the skin comprises to exclude pixels with color values that do not satisfy a predefined relationship.

Example 16 includes a method to identify a person based on skin features, comprising obtaining, with the image capture device of a compute device, an image that depicts the skin of the person; identifying, by the compute device, pixels in the obtained image that are associated with the skin of the person; determining, by the compute device, one or more features of the skin based on the identified pixels; generating, by the compute device, a feature vector that includes the determined features of the skin; and analyzing, by the compute device, the feature vector with reference data to determine an identity of the person.

Example 17 includes the subject matter of Example 16, and wherein determining one or more features of the skin based on the identified pixels comprises determining the one or more features of the skin based on a color of each identified pixel.

Example 18 includes the subject matter of any of Examples 16 and 17, and wherein determining the one or more features comprises determining a mode for each of red, green, blue, and gray values of the identified pixels; and determining an average of each of the red, green, and blue values.

Example 19 includes the subject matter of any of Examples 16-18, and wherein determining the one or more features further comprises determining normalized values of the averages of the red, green, and blue values.

Example 20 includes the subject matter of any of Examples 16-19, and wherein identifying pixels associated with the skin comprises excluding pixels with color values that fall outside of a predefined range of color values.

Example 21 includes the subject matter of any of Examples 16-20, and wherein analyzing the feature vector comprises providing the feature vector to a support vector machine (SVM) classifier with a pre-trained SVM model that is based on other images that depict skin.

Example 22 includes the subject matter of any of Examples 16-21, and wherein obtaining the image comprises obtaining an image of the face of the person.

Example 23 includes the subject matter of any of Examples 16-22, and wherein obtaining the image comprises obtaining an image of a palm of the person.

Example 24 includes the subject matter of any of Examples 16-23, and further including outputting, by the compute device, an indication of the determined identity and a confidence value indicative of a confidence that the determined identity is accurate.

Example 25 includes the subject matter of any of Examples 16-24, and further including determining, by the compute device, a distance between the eyes of the person based on the obtained image; and adding, by the compute device, the determined distance to the feature vector to determine the identity of the person based additionally on the determined distance.

Example 26 includes the subject matter of any of Examples 16-25, and wherein determining the distance between the eyes comprises converting, by the compute device, the obtained image from color to grayscale; performing, by the compute device, an automatic threshold operation on the grayscale image to convert the grayscale image to a binary black and white image; performing, by the compute device, an edge detection operation on the binary image to generate an edge image; determining, by the compute device, an area occupied by the eyes in the edge image; cropping, by the compute device, the edge image to the determined area to generate a cropped edge image; performing, by the compute device, a dilation operation on the cropped edge image to generate a dilated image; applying, by the compute device, a connected components algorithm to the dilated image to identify blocks that contain the eyes; and determining, by the compute device, a Euclidean distance between the centers of the identified blocks.

Example 27 includes the subject matter of any of Examples 16-26, and wherein performing an edge detection operation comprises applying an edge detection algorithm to preserve image moments.

Example 28 includes the subject matter of any of Examples 16-27, and further including determining, by the compute device, whether the determined identity satisfies predefined authentication data; enable, by the compute device and in response to a determination that the determined identity satisfies the predefined authentication data, access to one or more resources available to the compute device; and withholding, by the compute device and in response to a determination that the determined identity does not satisfy the predefined authentication data, access to the one or more resources available to the compute device.

Example 29 includes the subject matter of any of Examples 16-28, and wherein the one or more resources include a server coupled to the compute device.

Example 30 includes the subject matter of any of Examples 16-29, and wherein identifying pixels associated with the skin comprises excluding, by the compute device, pixels with color values that do not satisfy a predefined relationship.

Example 31 includes one or more computer-readable storage media comprising a plurality of instructions that, when executed by a compute device, cause the compute device to perform the method of any of Examples 16-30.

Example 32 includes a compute device comprising means for obtaining, with an image capture device of the compute device, an image that depicts the skin of the person; means for identifying pixels in the obtained image that are associated with the skin of the person; means for determining one or more features of the skin based on the identified pixels; means for generating a feature vector that includes the determined features of the skin; and means for analyzing the feature vector with reference data to determine an identity of the person.

Example 33 includes the subject matter of Example 32, and wherein the means for determining one or more features of the skin based on the identified pixels comprises means for determining the one or more features of the skin based on a color of each identified pixel.

Example 34 includes the subject matter of any of Examples 32 and 33, and wherein the means for determining the one or more features comprises means for determining a mode for each of red, green, blue, and gray values of the identified pixels; and means for determining an average of each of the red, green, and blue values.

Example 35 includes the subject matter of any of Examples 32-34, and wherein the means for determining the one or more features further comprises means for determining normalized values of the averages of the red, green, and blue values.

Example 36 includes the subject matter of any of Examples 32-35, and wherein the means for identifying pixels associated with the skin comprises means for excluding pixels with color values that fall outside of a predefined range of color values.

Example 37 includes the subject matter of any of Examples 32-36, and wherein the means for analyzing the feature vector comprises means for providing the feature vector to a support vector machine (SVM) classifier with a pre-trained SVM model that is based on other images that depict skin.

Example 38 includes the subject matter of any of Examples 32-37, and wherein the means for obtaining the image comprises means for obtaining an image of the face of the person.

Example 39 includes the subject matter of any of Examples 32-38, and wherein the means for obtaining the image comprises means for obtaining an image of a palm of the person.

Example 40 includes the subject matter of any of Examples 32-39, and further including means for outputting an indication of the determined identity and a confidence value indicative of a confidence that the determined identity is accurate.

Example 41 includes the subject matter of any of Examples 32-40, and further including means for determining a distance between the eyes of the person based on the obtained image; and means for adding the determined distance to the feature vector to determine the identity of the person based additionally on the determined distance.

Example 42 includes the subject matter of any of Examples 32-41, and wherein the means for determining the distance between the eyes comprises means for converting the obtained image from color to grayscale; means for performing an automatic threshold operation on the grayscale image to convert the grayscale image to a binary black and white image; means for performing an edge detection operation on the binary image to generate an edge image; means for determining an area occupied by the eyes in the edge image; means for cropping the edge image to the determined area to generate a cropped edge image; means for performing a dilation operation on the cropped edge image to generate a dilated image; means for applying a connected components algorithm to the dilated image to identify blocks that contain the eyes; and means for determining a Euclidean distance between the centers of the identified blocks.

Example 43 includes the subject matter of any of Examples 32-42, and wherein the means for performing an edge detection operation comprises means for applying an edge detection algorithm to preserve image moments.

Example 44 includes the subject matter of any of Examples 32-43, and further including means for determining whether the determined identity satisfies predefined authentication data; means for enabling, in response to a determination that the determined identity satisfies the predefined authentication data, access to one or more resources available to the compute device; and means for withholding, in response to a determination that the determined identity does not satisfy the predefined authentication data, access to the one or more resources available to the compute device.

Example 45 includes the subject matter of any of Examples 32-44, and wherein the one or more resources include a server coupled to the compute device.

Example 46 includes the subject matter of any of Examples 32-45, and wherein the means for identifying pixels associated with the skin comprises means for excluding pixels with color values that do not satisfy a predefined relationship.

The invention claimed is:

1. One or more non-transitory computer-readable storage media comprising a plurality of instructions that, when executed by a compute device, cause the compute device to at least:
   identify colors of pixels in an image;
   filter the pixels based on the identified colors by:
      assessing if a red component of respective pixels and a green component of the respective pixels satisfy a first color range condition;
      assessing if the red component, the green component, and a blue component of the respective pixels satisfy a second color range condition;
      categorizing respective pixels that satisfy both the first color range condition and the second color range condition into a first group; and
      categorizing respective pixels that fail to satisfy at least one of the first color range condition or the second color range condition into a second group;
   identify pixels that are associated with skin of a person based on the filtered pixels; and
   determine one or more features of the skin based on the identified pixels, wherein the determined one or more features are to be used in a feature vector to determine an identity of the person.

2. The one or more non-transitory computer-readable storage media of claim 1, wherein to determine one or more features of the skin based on the identified pixels, the instructions cause the compute device to determine the one or more features of the skin based on a color of respective ones of the identified pixels.

3. The one or more non-transitory computer-readable storage media of claim 1, wherein to determine the one or more features, the instructions cause the compute device to:
   determine a mode for respective ones of red, green, blue, and gray values of the identified pixels; and
   determine an average of respective ones of the red, green, and blue values.

4. The one or more non-transitory computer-readable storage media of claim 3, wherein to determine the one or more features, the instructions cause the compute device to determine normalized values of the averages of the red, green, and blue values.

5. The one or more non-transitory computer-readable storage media of claim 1, wherein to analyze the feature vector, the instructions cause the compute device to provide the feature vector to a support vector machine (SVM) classifier with a pre-trained SVM model that is based on other images that depict skin.

6. The one or more non-transitory computer-readable storage media of claim 1, wherein to identify pixels that are associated with the skin of the person, the instructions cause the compute device to pixels that are associated with the skin of the person in an image of the face of the person.

7. The one or more non-transitory computer-readable storage media of claim 1, wherein to identify pixels that are associated with the skin of the person, the instructions cause the compute device to identify pixels that are associated with the skin of the person in an image of a palm of the person.

8. A method comprising:
   identifying, by a compute device, colors of pixels in an image;
   filtering the pixels based on the identified colors by:
      assessing if a red component of respective pixels and a green component of the respective pixels satisfy a first color range condition;
      assessing if the red component, the green component, and a blue component of the respective pixels satisfy a second color range condition;
      categorizing respective pixels that satisfy both the first color range condition and the second color range condition into a first group; and
      categorizing respective pixels that fail to satisfy at least one of the first color range condition or the second color range condition into a second group;
   identifying pixels that are associated with skin of a person based on the filtered pixels; and
   determining, by the compute device, one or more features of the skin based on the identified pixels, wherein the determined one or more features are to be used in a feature vector to determine an identity of the person.

9. The method of claim 8, wherein the identifying of the pixels in the image that are associated with the skin includes setting, to a predefined value, component color values of the pixels in the image that not associated with skin.

10. A compute device comprising:
    memory; and
    circuitry to:
       identify, in an image, colors of pixels;
       filter the pixels based on the identified colors by:
          assessing if a red component of respective pixels and a green component of the respective pixels satisfy a first color range condition;
          assessing if the red component, the green component, and a blue component of the respective pixels satisfy a second color range condition;
          categorizing respective pixels that satisfy both the first color range condition and the second color range condition into a first group; and
          categorizing respective pixels that fail to satisfy at least one of the first color range condition or the second color range condition into a second group;
       identify the pixels in the first group as associated with skin of a person; and
       determine one or more features of the skin based on the identified pixels, wherein the determined one or more features are to be used in a feature vector to determine an identity of the person.

11. The compute device of claim 10, wherein to determine the one or more features, the circuitry is to:
    determine a mode for respective ones of red, green, blue, and gray values of the identified pixels; and
    determine an average of respective ones of the red, green, and blue values.

12. The compute device of claim 11, wherein to determine the one or more features, the circuitry is to determine normalized values of the averages of the red, green, and blue values.

13. The compute device of claim 10, wherein the circuitry is to provide the feature vector to a support vector machine (SVM) classifier with a pre-trained SVM model that is based on other images that depict skin.

14. The compute device of claim 10, wherein to identify pixels that are associated with the skin of the person, the circuitry is to identify pixels that are associated with the skin of the person in an image of the face of the person.

15. The compute device of claim 10, wherein to identify pixels that are associated with the skin of the person, the circuitry is to identify pixels that are associated with the skin of the person in an image of a palm of the person.

16. The compute device of claim 10, wherein the circuitry is to output an indication of the determined identity and a confidence value indicative of a confidence that the determined identity is accurate.

17. The compute device of claim 10, wherein the circuitry is to determine a distance between the eyes of the person based on the image and add the determined distance to the feature vector.

18. The compute device of claim 10, wherein the circuitry is to set one or more color values of the pixels in the second group to a value indicative that the corresponding pixel is not representative of skin.

19. A compute device comprising:
  memory; and
  circuitry to:
    identify, in an image, colors of pixels;
    filter the pixels based on the identified colors;
    identify pixels that are associated with skin of a person based on the filtered pixels;
    determine one or more features of the skin based on the identified pixels, wherein the determined one or more features are to be used in a feature vector to determine an identity of the person; and
    determine a distance between the eyes of the person based on the image and add the determined distance to the feature vector, to determine the distance between the eyes of the person, the circuitry is to:
    convert the image from color to a grayscale image;
    generate a binary black and white image based on an auto-thresholding of the grayscale image;
    identify edges in the binary black and white image;
    crop the binary black and white image to an area that depicts eyes of the person based on the identified edges;
    identify blocks within the binary black and white image that contain the eyes; and
    determine, as the distance between the eye, a Euclidean distance between centers of the blocks.

20. The compute device of claim 19, wherein to identify the pixels associated with the skin, the circuitry is to identify pixels that have a color component that satisfies a predefined relationship with other color components of the same pixel.

21. The compute device of claim 19, wherein to determine the one or more features of the skin based on the identified pixels, the circuitry is to determine the one or more features of the skin based on a color of respective ones of the identified pixels.

22. One or more non-transitory computer-readable storage media comprising a plurality of instructions that, when executed by a compute device, cause the compute device to at least:
  identify, in an image, colors of pixels;
  filter the pixels based on the identified colors;
  identify pixels that are associated with skin of a person based on the filtered pixels;
  determine one or more features of the skin based on the identified pixels, wherein the determined one or more features are to be used in a feature vector to determine an identity of the person; and
  determine a distance between the eyes of the person based on the image and add the determined distance to the feature vector by:
    converting the image from color to a grayscale image;
    generating a binary black and white image based on an auto-thresholding of the grayscale image;
    identifying edges in the binary black and white image;
    cropping the binary black and white image to an area that depicts eyes of the person based on the identified edges;
    identifying blocks within the binary black and white image that contain the eyes; and
    determining, as the distance between the eye, a Euclidean distance between centers of the blocks.

23. The one or more non-transitory computer-readable storage media of claim 22 wherein to identify pixels associated with the skin, the instructions cause the compute device to identify pixels that have a color component that satisfies a predefined relationship with other color components of the same pixel.

* * * * *